Feb. 2, 1937.   J. W. WHITE   2,069,343
HYDRAULIC BRAKE
Filed Jan. 8, 1932   2 Sheets-Sheet 1

INVENTOR
John W. White
BY Whittemore Hulbert
Whittemore & Belknap
ATTORNEYS

Feb. 2, 1937.      J. W. WHITE      2,069,343
HYDRAULIC BRAKE
Filed Jan. 8, 1932      2 Sheets-Sheet 2
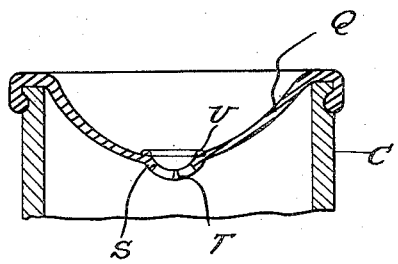
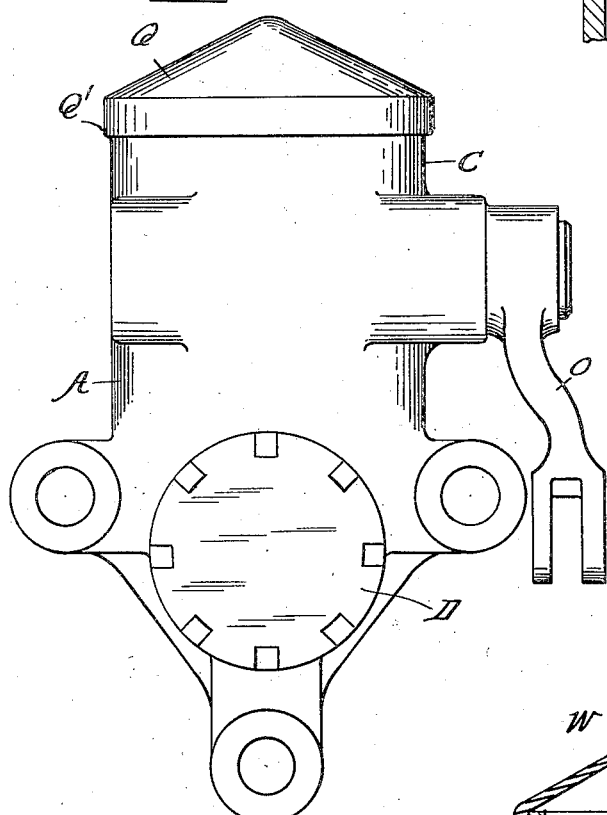
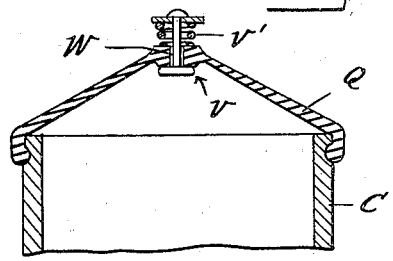
INVENTOR
John W. White
BY Whittemore Hulbert
Whittemore & Belknap
ATTORNEYS Patented Feb. 2, 1937

2,069,343

UNITED STATES PATENT OFFICE 2,069,343

HYDRAULIC BRAKE

John William White, Detroit, Mich., assignor, by mesne assignments, to Bendix Products Corporation, a corporation of Indiana Application January 8, 1932, Serial No. 585,615

4 Claims. (Cl. 220—24)

The invention relates to hydraulic brake systems of that type provided with automatic compensating means for maintaining the system full of the operating fluid. More specifically, the invention relates to constructions in which a fluid reservoir is associated with the master cylinder and so connected thereto as to effect the desired compensation.

Heretofore constructions have been made in which the supply reservoir is arranged to cover and seal the end of the cylinder through which the piston is operated and to contain a portion of the operating mechanism. With such constructions the movement of the piston not only displaces fluid in the master cylinder but also in the reservoir and to permit of this displacement it is usual to vent the reservoir for communication with the external atmosphere. This, however, is objectionable inasmuch as the fluid employed usually contains a volatile element such as alcohol, a portion of which may be lost through the vent, thereby changing the viscosity of the fluid. Also, contact of atmospheric air with the fluid is objectionable due to the fact that certain ingredients are subject to oxidation or are otherwise detrimentally affected, resulting in the precipitation of sediment which might interfere with the operation of the system.

It is the object of the present invention to obtain a construction of master cylinder provided with a supply reservoir which is hermetically sealed but which will provide for piston displacement and will automatically compensate for fluid losses in the system. It is a further object to obtain a simple mechanical construction which can be manufactured at low cost and the parts of which can be easily assembled or detached when necessary. The invention therefore consists in the construction as hereinafter set forth.

In the drawings:

Figure 3 is an end elevation;

Figures 4 and 5 are views similar to a portion of Figure 1 showing modified constructions.

Figures 1, 2:
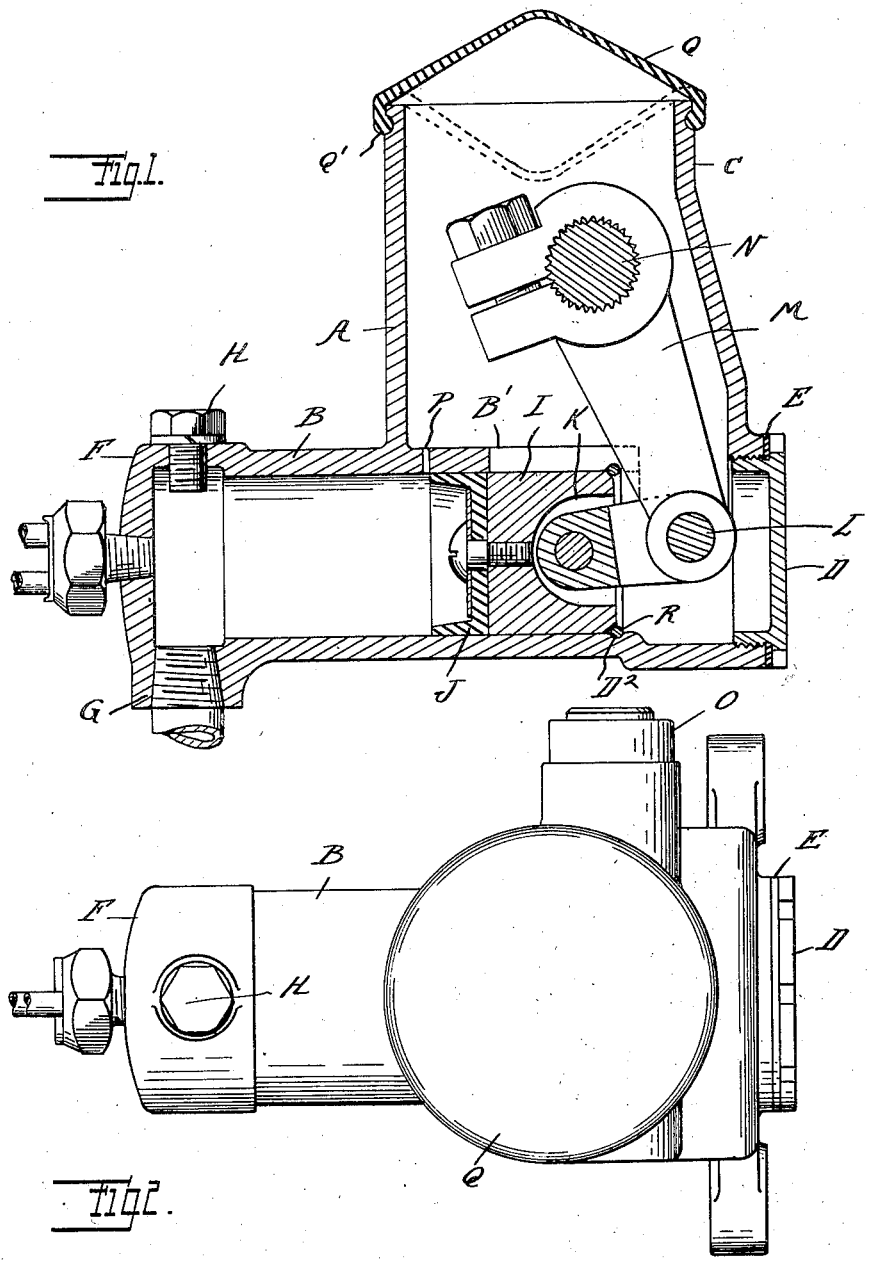
Figure 1 is a vertical central section through my improved master cylinder.
Figure 2 is a plan view thereof.

As shown, A is a casing comprising a horizontal cylindrical portion B and an upwardly extending reservoir portion C. The reservoir overlaps one end of the cylinder and has formed in its outer wall an aperture of sufficient area for the insertion of the piston and its connections. This aperture is closed by a cap D having a threaded engagement with the reservoir wall and provided with a suitable sealing gasket E. The opposite end of the cylinder portion B is preferably closed by an integral head F provided at the bottom thereof with a nipple G for connection to the hydraulic system. There is also provided a fill aperture at the top of the head which is normally closed by a screw threaded cap H.

Within the cylinder B is a piston I provided with a packing cup J which is effective to form a seal during movement of the piston in an outward direction. The rear end of the piston is recessed at K to receive the end of a pivotal link L connecting the piston with an actuating rock arm M. This rock arm is located in the reservoir C being mounted on a rock shaft N which extends out through bearings in the casing A and has on its outer end an actuating rock arm O. The cylinder portion B is also provided with a slot B' which permits the rocking movement of the arm M and the actuation of the piston thereby in a direction towards the outer end of the cylinder.

With the parts as thus far described, it will be understood that the rocking of the arm O through the brake pedal or other actuating means will cause the outward movement of the piston I within the cylinder B displacing fluid in said cylinder into the connected hydraulic system. As the piston moves forward fluid from the reservoir C will follow the same and during the return movement of the piston this fluid will be displaced back into the reservoir again. Thus any leakage by the piston will not escape from the casing A but will merely pass from one compartment to the other thereof. To maintain the system full there is a port P through the wall of the cylinder located just in advance of the cup J in the retracted position of the piston I. This port is, however, sealed during the initial forward movement of the piston.

As has been stated, the fluid generally used in hydraulic systems of this character is one containing alcohol or some other volatile ingredient mixed with a vegetable oil such as castor oil or a lubricant. To retain this volatile element and at the same time to permit displacement of the fluid during the movement of the piston I have provided the reservoir C with a flexible sealing cap. This as shown is a conical rubber cap Q having a beaded flange Q' which may be snapped into engagement with a corresponding annular groove in the wall of the reservoir C near the upper end thereof. The cap is sufficiently flexible and resilient to permit variation in the volume of liquid and gas in the reservoir and also to permit feeding of the liquid as necessary through the port P to replace fluid in the system.

flexibility of the cap is increased by diminishing its thickness towards the center or apex of the cone which permits this portion to first move inward and to gradually draw the other portions after it.

When the apparatus is first installed the fill cap H and flexible cap Q are removed and liquid is filled into the cylinder and connected system and through the port P, filling the reservoir to a predetermined height. The cap H is then replaced and the cap Q is snapped into engagement with the groove in the receptacle wall. Whenever it is necessary to refill the reservoir the caps H and Q can again be removed and the filling operation repeated.

To limit the outward movement of the piston I the cylinder B is provided with a groove $D^2$ into which a snap ring R may be inserted. The rear end of the piston is also slightly chamfered to engage said snap ring, holding it from disengagement from the groove and being stopped from further movement thereby.

The amount of deflection of which the cap is capable will be equal to the maximum displacement volume of the piston under a single actuation. Inasmuch, however, as the fluid within the reservoir is being gradually fed into the hydraulic system, this will eventually produce a displacement in excess of the capacity of the flexible cap. I therefore preferably provide means permitting ingress of air to compensate for this added displacement without, however, permitting any passage during the ordinary displacement of the piston. This as shown in Figure 4 comprises an inwardly extending bulbular portion S at the center of the cap Q provided with cross slits T therein and surrounded by a ring U of harder rubber. Under the ordinary breathing operations of the cap the slits T will remain closed so as to hermetically seal, but whenever the cap has reached the limit of its inward deflection and there is still further displacement of the fluid within the receptacle, this by producing partial vacuum will deflect the portion S inward opening the slits and permitting ingress of air.

In the construction shown in Figure 5, I have placed a valve V normally held closed by a spring V' to close a port W at the center of the cap. This valve will open where the pressure of the external atmosphere is greater than the pressure within the casing and will thus compensate for additional displacements.

What I claim as my invention is:

1. A sealing and displacement compensating means for fluid reservoirs comprising a non-metallic flexible cap having a peripheral flange for removably engaging the wall of the reservoir and being normally of a substantially conical convex form capable of reversing to a concave position.

2. A sealing and displacement compensating means for fluid reservoirs comprising a flexible cap of normally substantially conical convex form, the walls of said cap diminishing in thickness from the periphery towards the center to facilitate reversing to concave form.

3. A sealing and displacement compensating means for fluid reservoirs comprising a rubber cap having a peripheral beaded flange for detachable engagement with the wall of the reservoir, said cap being normally of a substantially conical convex form with its walls diminishing in thickness from the periphery towards the center to facilitate reversal to a concave form.

4. A sealing and displacement compensating means for fluid reservoirs comprising a removable non-metallic flexible closure cap, collapsible from convex to concave form with a predetermined displacement, and means in said cap permitting ingress of air when fluid displacement in said reservoir is in excess of the maximum displacement of said cap.

JOHN WILLIAM WHITE.